June 23, 1942.  W. B. McMILLAN  2,287,695
WEIGHING SCALE
Filed Sept. 21, 1940  2 Sheets-Sheet 2
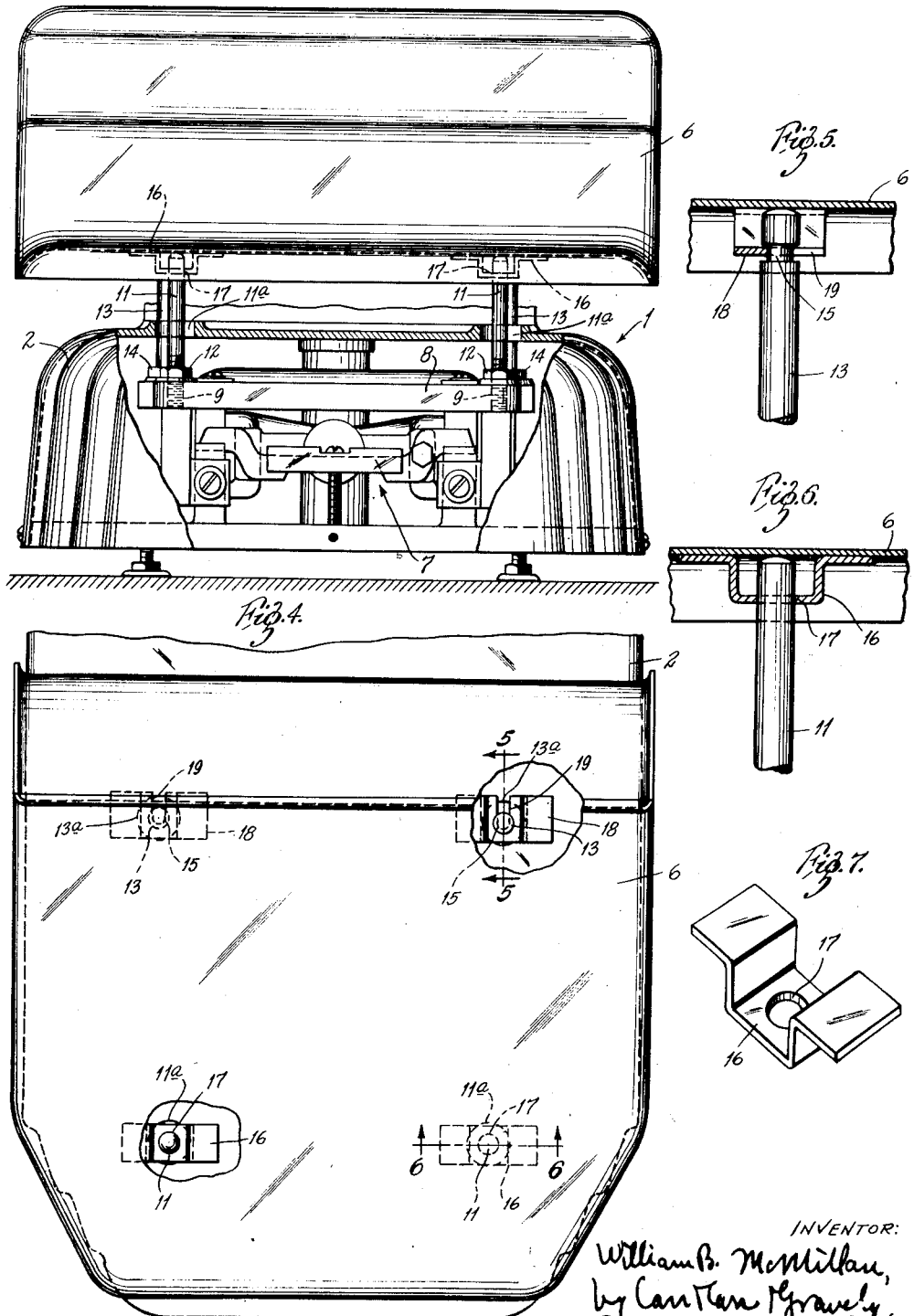

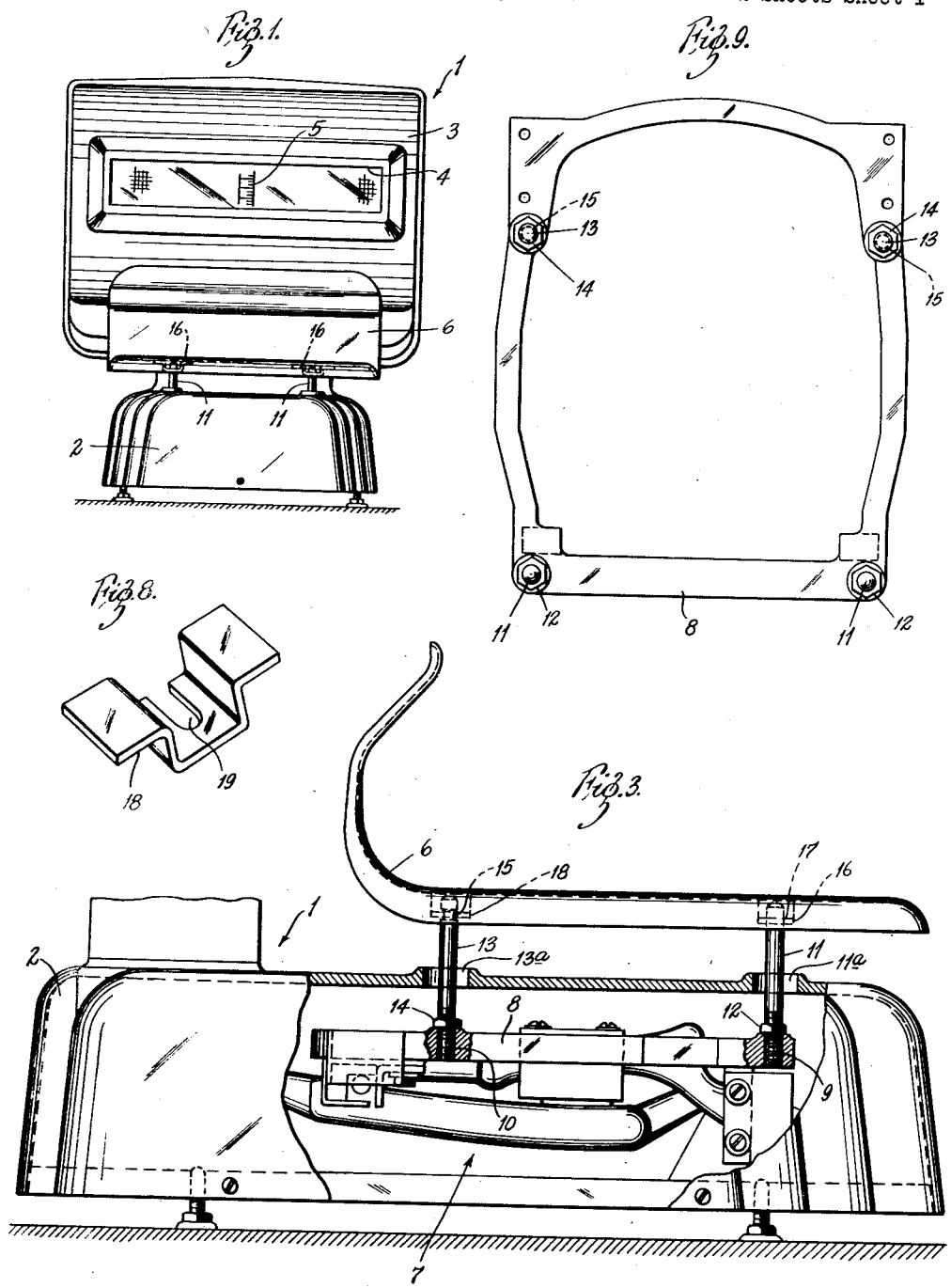

Patented June 23, 1942

2,287,695

UNITED STATES PATENT OFFICE 2,287,695

WEIGHING SCALE

William B. McMillan, Clayton, Mo., assignor to Hussmann-Ligonier Company, St. Louis, Mo., a corporation of Missouri Application September 21, 1940, Serial No. 357,695

7 Claims. (Cl. 265—27)

This invention relates to weighing scales of the kind commonly used in grocery stores or meat markets and, more particularly, to means for supporting and retaining the load holder or load receiving platter of such scales.

The principal objects of the present invention are to devise a simple and inexpensive means for supporting and retaining in proper position a load holder or load receiving platter which will retain the platter properly in position yet permit it to be easily and quickly removed from the scale. A further object is to devise a platter retaining and supporting means which may be easily and quickly adjusted.

The invention consists principally in the scale and in the platter supporting and retaining means therefor and in the parts and combinations and arrangements of parts hereinafter described and claimed.

In the accompanying drawings which form part of the specification and wherein like symbols refer to like parts wherever they occur.

Fig. 1 is a front elevational view of a usual grocery or meat market scale provided with platter supporting and retaining means embodying my invention.

Fig. 2 is an enlarged front view of the base and platter of the scale with a part of the base housing torn away.

Fig. 3 is an enlarged side view of the base and platter of the scale with a part of the base housing torn away.

Fig. 4 is a plan view of the platter of the scale.

Fig. 5 is an enlarged sectional view taken on line 5—5 in Fig. 4.

Fig. 6 is an enlarged sectional view taken on the line 6—6 of Fig. 4.

Fig. 7 is a perspective view of a front post retaining member.

Fig. 8 is a perspective view of a rear post retaining member; and

Fig. 9 is a plan view of the platter supporting frame.

In the accompanying drawings, my invention is shown embodied in a well known type of grocery or meat market scale. The scale comprises a housing indicated generally by 1 having a base portion 2 and an upper cylindrical portion 3 having an opening 4 therein which is covered with a glass cover through which a portion of the cylindrical indicating chart 5 is exposed to view Mounted on the base is a load holder or load receiving platter 6 on which an article to be weighed is placed.

The weighing mechanism 7 mounted in the base portion 2 of the housing may be of any well known construction and forms no part of the present invention. Consequently, it is not shown or described in detail.

Secured to the weighing mechanism 7 is a platter supporting frame 8 having two circular openings 9 extending through the front portion thereof, said frame having annular ribs extending upwardly around said openings to form seats, and two circular openings 10 extending through the rear portion of the frame, said frame also having annular ribs extending upwardly around said rear openings 10 to form seats. The frame is mounted on the weighing mechanism so as to move upwardly or downwardly in a horizontal plane.

Front platter supporting posts 11 having threaded lower ends on which are screwed nuts 12 are mounted in said front openings 9 in the frame, said nuts 12 seating on the ribs and said posts extending upwardly above the housing through openings 11a in the base portion of the housing. Rear posts 13 having threaded lower ends with nuts 14 screwed thereon are mounted in the rear openings 10 in the frame, said nuts seating on the ribs and said rear posts extend upwardly through openings 13a in the top of said base portion of the housing. The upper ends of the front and rear posts 11 and 13 respectively are rounded and said rear posts 13 have reduced neck portions 15 adjacent to the upper ends thereof.

Secured to the under side of the platter 6 by welding or by other suitable means are two channel-shaped front post engaging members 16. These members have openings 17 therethrough adapted to receive said front posts 11. Secured to the underside of the rear of said platter 6 are two rear channel-shaped post engaging members 18 having slots 19 therein adapted to engage the reduced neck portion 15 of said rear posts 13.

To mount the platter on the scale, the front posts 11 and rear posts 13 are mounted on the platter supporting frame 8 so that their rounded ends are all in the same horizontal plane. This is done by adjusting the nuts 12 and 14 on the threaded lower ends of said posts. Next, the rear end of the platter is mounted so that the slots 19 in the post engaging members 18 engage the reduced neck portions 15 of the rear posts 13. The front end of the platter is then lowered onto the front posts 11, said posts passing through the openings 17 in said platter retaining members 16. Thus, the platter is properly positioned atop the posts and is prevented from moving horizontally by the post engaging members of the platter engaging said posts.

My platter retaining and supporting means have numerous advantages. The mountings are inexpensive and durable. The platter may be easily mounted with a minimum of trouble and it is a simple matter to make any necessary adjustment. Furthermore, it is not necessary to disassemble the base housing when making such an adjustment.

Obviously, numerous modifications may be made and I do not wish to be limited to the precise construction shown.

What I claim is:

1. A weighing scale comprising weighing mechanism having a platter supporting frame secured thereto, front platter supporting posts mounted on the front portion of said frame, rear platter supporting posts having reduced neck portions near their upper ends mounted on said frame and a platter having front post retaining members with openings therethrough adapted to retain said front posts and rear post retaining members having slots therein adapted to engage said reduced neck portions in said rear posts, said platter resting on top of all of said posts and being prevented from horizontal movement by said retaining members engaging said post.

2. A weighing scale comprising weighing mechanism having a platter supporting frame secured thereto, front platter supporting posts mounted on the front portion of said frame, rear platter supporting posts having reduced neck portions near their upper ends mounted on said frame and a platter having channel-shaped front post retaining members with openings therethrough adapted to retain said front posts and channel-shaped rear post retaining members having slots therein adapted to engage said reduced neck portions in said rear posts, said platter resting on top of all of said posts and being prevented from horizontal movement by said retaining members.

3. A weighing scale comprising weighing mechanism having a platter supporting frame secured thereto, said frame having openings through the front and rear portions thereof, front platter supporting posts adjustably mounted in said front openings in said frame, rear platter supporting posts adjustably mounted in said openings in the rear portion of said frame, a platter resting on said posts, said platter having front platter retaining members secured to the underside thereof, said front platter retaining members having circular openings therethrough, said front posts extending through said openings, rear posts retaining members having slots therein secured to the rear of said platter and engaging said rear posts, said rear posts having portions that overhang the margins of the slots in said rear post retaining members and prevent upward movement thereof, said platter being prevented from horizontal movement by said retaining members engaging said posts.

4. A weighing scale comprising weighing mechanism having a platter supporting frame secured thereto, said frame having openings through the front and rear portions thereof, front platter supporting posts having threaded lower end portions, nuts on said end portions and said posts mounted in said front openings in said frame, rear platter supporting posts having threaded lower end portions, nuts on said threaded lower ends and said rear posts mounted in said openings in the rear portion of said frame, a platter resting on said posts, said platter having front platter retaining members secured thereto, said rear posts having reduced neck portions near their upper ends, said front platter retaining members having circular openings therethrough, said front posts adapted to extend through said openings, rear posts retaining members secured to said platter, said rear post retaining members having slots therein adapted to engage said reduced neck portions in said rear posts, said platter being prevented from horizontal movement by said retaining members engaging said posts.

5. A weighing scale comprising weighing mechanism having a platter supporting frame secured thereto, said frame having pairs of openings through the front and rear portions thereof, a pair of front platter supporting posts having threaded lower end portions, nuts on said end portions, said posts being mounted in said front openings in said frame, a pair of rear platter supporting posts having threaded lower end portions, nuts on said threaded lower ends, said rear posts being mounted in said openings in the rear portion of said frame, a platter resting on said posts, said platter having front platter retaining members secured thereto, said rear posts having reduced neck portions adjacent to their upper ends, said front platter retaining members being channel shaped and having circular openings therethrough, said front posts extending through said openings, rear channel-shaped post retaining members secured to said platter, said rear post retaining members having slots therein adapted to engage said reduced neck portions in said rear posts, said platter being prevented from horizontal movement by said retaining members engaging said posts.

6. A weighing scale comprising weighing mechanism having a platter supporting frame secured thereto, front platter supporting posts mounted on said frame, rear platter supporting posts mounted on said frame and a platter having front post retaining members with openings therethrough adapted to retain said front posts and rear post retaining members having slots therein adapted to retain said rear posts, said platter resting on top of all of said posts and being retained in position by said retaining members engaging said posts, said rear posts having portions that overhang the margins of the slots in said rear post retaining members and prevent upward movement thereof.

7. A weighing scale comprising weighing mechanism having a platter supporting frame secured thereto, front platter supporting posts adjustable mounted on the front portion of said frame, rear platter supporting posts having reduced neck portions near their upper ends adjustably mounted on said frame and a platter having front post retaining members with openings therethrough adapted to retain said front posts and rear post retaining members having slots therein adapted to engage said reduced neck portions in said rear posts, said platter resting on top of all of said posts and being prevented from horizontal movement by said retaining members engaging said posts.

WILLIAM B. McMILLAN.